UNITED STATES PATENT OFFICE.

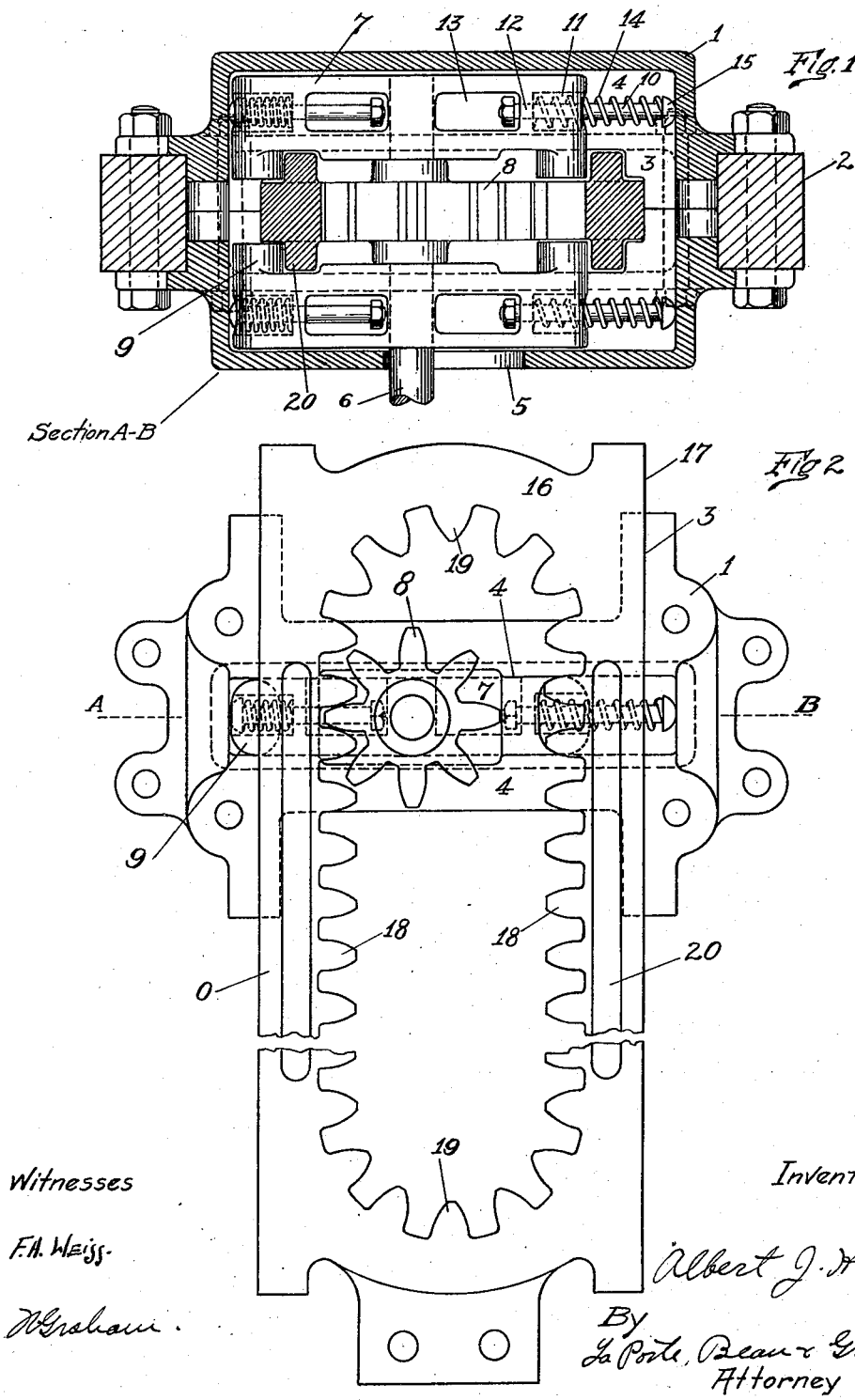

ALBERT J. HARTLEY, OF DECATUR, ILLINOIS, ASSIGNOR OF ONE-FOURTH TO PORTER J. MILLIKIN, ONE-FOURTH TO H. CLAY DEMPSEY, ONE-FOURTH TO FRANK J. TEMPLE, AND ONE-FOURTH TO MAX H. HURD, ALL OF DECATUR, ILLINOIS.

MECHANICAL MOVEMENT.

1,191,695.  Specification of Letters Patent.  Patented July 18, 1916.

Application filed March 13, 1915. Serial No. 14,119.

*To all whom it may concern:*

Be it known that I, ALBERT J. HARTLEY, a citizen of the United States, residing at Decatur, in the county of Macon and State of Illinois, have invented certain new and useful Improvements in Mechanical Movements of which the following is a specification.

My invention relates to improvements in mechanical movement, generally stated as a mechanical movement for transforming rotary motion into reciprocating motion.

The principal object of my invention is the provision of a rotary driving element in the form of a pinion adapted to engage the continuous series of internal teeth provided in a reciprocable driven member so as to reciprocate the same, the driving member being mounted to shift so as to be in continuous engagement with said teeth, suitable guiding or holding means being provided for maintaining an operative relation between the parts and also means being provided for absorbing the shock of the shifting of said driving element, whereby a simple, efficient, strong, noiseless and durable mechanism is provided for the purpose specified.

To the accomplishment of the foregoing and such other objects as may hereinafter appear my invention consists in the combination, construction and arrangement of parts hereinafter described and then sought to be defined in the appended claims reference being had to the accompanying drawings forming a part hereof and which show for the purpose of illustrative disclosure a preferred embodiment of my invention, it being understood that various changes may be made in practice within the scope of the claims without digressing from my inventive idea.

In the drawing, Figure 1 represents a transverse horizontal section through a mechanism constructed according to my invention. Fig. 2 is a side elevation, parts being removed to facilitate the disclosure.

Referring now to the drawings, the numeral 1 designates the two part casing or frame support supported by means of suitable studs or supports 2 in position for operation. This casing is provided with longitudinal guideways 3 on each side to slidably receive the driven member and also the transverse guideways 4 to slidably support the driving member or element.

One side of the casing is provided with the elongated slot or aperture 5 to permit the passage of shaft 6 to which power is applied. This shaft is journaled in sliding members or blocks 7 which are spaced apart to receive therebetween the small gear or pinion 8 on shaft 6. These sliding members or blocks 7 are elongated and slidably fit in the guideways 4. Projecting inwardly from each end of each of the sliding blocks are the guiding and locking lugs or projections 9, the purpose of which will be described later. Each of these sliding blocks 7 is provided with buffing means or means to take up the shock and jar of operation, this means taking the form of a rod or bolt 10 slidably mounted in the end portion of the block 7 and extending through socket or recess 11 and aperture 12 into the opening or slot 13. A suitable spring 14 is provided between the head 15 of the bolt and the bottom of the socket or recess 11 normally projecting the bolt but permitting its movement inwardly, the spring compressing and taking up the shock and jar, decreasing the wear and tear, and noise and vibration.

The driven member takes the form of a yoke 16 having straight sides 17 slidable in guides 3. A series of teeth are arranged internally in a somewhat elliptical path, the elongated series being internal rack teeth 18 and the curved series at the ends being internal gear teeth 19. The gear or pinion 8 engages with the said series of teeth and causes a reciprocation of the yoke when power is applied thereto. Due to the slidable mounting of the gear or pinion 8, it readily follows the curve of and engages the internal gear teeth 19.

Suitable guiding or holding means is provided for holding the gear or pinion 8 in engagement with the internal rack teeth 18 and for releasing said gear so that it can follow the path of the internal gear teeth 19. This means takes the form of the elongated flange or projection 20 on each side of said yoke, said flanges terminating short of or adjacent the end of the rack teeth, as shown. The lugs or projections 9 are positioned on the outside of these flanges 20, as shown to the left in Fig. 2, when the gear or pinion 8 is in engagement with that side of the rack. This prevents the movement of the gear or pinion away from the rack until the longitudinal movement is completed. Then the lugs or projections pass beyond the end of the flanges 20 and the gear or pinion is permitted to follow the curve of the gear teeth 19 transversely across the end of the yoke, until it starts the longitudinal movement on the other side, the sliding blocks 7 having moved so that the other lugs or projections 9 are positioned on the outside of the other flanges 20, so that the gear is held in engagement with the rack teeth during the longitudinal movement.

The yoke is connected to the part or mechanism to be driven or reciprocated, as is well understood.

It is therefore obvious that I provide a simple and efficient mechanism for the transformation of rotary motion into reciprocating motion. The various parts are positively held in engagement. Shock, noise and jar are eliminated and the possibility of accident avoided.

What I claim is,—

1. In a mechanism of the character described and in combination, a supporting means having longitudinal guideways and also a transverse guide-way on each side of said longitudinal guide-ways, a driven member slidably arranged in said longitudinal guideways and having an internally toothed track, blocks slidably arranged in said transverse guideways, a driving shaft journaled in said blocks and having a gear thereon in engagement with said toothed track.

2. In a mechanism of the character described and in combination, a supporting means having longitudinal guideways and also transverse guideways, a driven member slidably arranged in said longitudinal guideways and having an internally toothed track, blocks slidably arranged in said transverse guideways, a driving shaft journaled in said blocks and having a gear thereon in engagement with said toothed track, said slidable blocks and said driven member having means coöperating to hold said gear in engagement with said toothed track.

3. In a mechanism of the character described and in combination, a supporting means having longitudinal guideways and also transverse guideways, a driven member slidably arranged in said longitudinal guideways and having an internally toothed track, blocks slidably arranged in said transverse guideways, a driving shaft journaled in said blocks and having a gear thereon in engagement with said toothed track, said slidable blocks each having studs thereon and said driven member having flanges on each side, said studs and flanges coöperating to hold said gear in engagement with said toothed track.

4. In a mechanism of the character described and in combination, a supporting means having longitudinal guideways and also transverse guideways, a driven member slidably arranged in said longitudinal guideways and having an internally toothed track, blocks slidably arranged in said transverse guideways, a driving shaft journaled in said blocks and having a gear thereon in engagement with said toothed track, said slidable blocks each having studs and said driven member having flanges on each side, said studs and flanges coöperating to hold the gear in engagement with said toothed track, said flanges terminating short of the ends of the toothed track, whereby relative longitudinal movement only between the parts will be permitted during part of the travel of said driven member and transverse movement of the blocks and gear will be permitted when the gear is in engagement with the end portions of the toothed track.

5. In a mechanism of the character described and in combination, a supporting means having longitudinal guideways and also transverse guideways, a driven member slidably arranged in said longitudinal guideways and having an internally toothed track, blocks slidably arranged in said transverse guideways, a driving shaft journaled in said blocks and having a gear thereon in engagement with said toothed track, and means for absorbing the shock and jar of the movement of said slidable blocks.

6. In a mechanism of the character described and in combination, a supporting means having longitudinal guideways and also transverse guideways, a driven member slidably arranged in said longitudinal guideways and having an internally toothed track, blocks slidably arranged in said transverse guideways, a driving shaft journaled in said blocks and having a gear thereon in engagement with said toothed track, and means for absorbing the shock and jar of the movement of said slidable blocks, said means including bolts slidably arranged in said blocks and bearing against said supporting means and springs normally holding said bolts in an extended position, the tension of the springs increasing when the bolts are forced inwardly by the movement of said blocks.

7. In a mechanism of the character described and in combination, a supporting means having longitudinal guideways and a transverse guide-way on each side of said longitudinal guide-ways, a driven member slidable in said longitudinal guideways and having a continuous internal toothed track substantially elliptical in shape with its long sides substantially straight and having internal rack teeth and with its ends formed with internal gear teeth, blocks slidably arranged in said transverse guideways, a driving shaft journaled in said blocks and having a gear between said blocks adapted to engage the straight portions of the toothed track, the blocks, shaft and gear being permitted to move transversely when the gear is in engagement with the ends of the toothed track.

8. In a mechanism of the character described and in combination, a supporting means having longitudinal guideways and transverse guideways, a driven member slidable in said longitudinal guideways and having a continuous internal toothed track substantially elliptical in shape with its long sides substantially straight and having internal rack teeth and with its ends formed with internal gear teeth, blocks slidably arranged in said transverse guideways, a driving shaft journaled in said blocks and having a gear adapted to engage the straight portions of the toothed track, the blocks, shaft and gear being permitted to move transversely when the gear is in engagement with the ends of the toothed track, and means for absorbing the shock and jar of the movement of said blocks.

9. In a mechanism of the character described and in combination, a supporting means having longitudinal guideways and transverse guideways, a driven member slidable in said longitudinal guideways, and having a continuous internal toothed track substantially elliptical in shape with its long sides substantially straight and having internal rack teeth and with its ends formed with internal gear teeth, blocks slidably arranged in said transverse guideways, a driving shaft journaled in said blocks and having a gear adapted to engage the straight portions of the toothed track, the blocks, shaft and gear being permitted to move transversely when the gear is in engagement with the ends of the toothed track, said blocks having studs on the ends and said driven member having flanges extending along said straight portions of the toothed track, said studs being adapted to be positioned alternately on opposite sides of said flanges when the gear is in engagement with the straight portions of the toothed track to hold it in position.

10. In a mechanism of the character described and in combination, a supporting means having longitudinal guide ways and a plurality of transverse guide-ways, a driven member slidably arranged in said longitudinal guide-ways and having an internally toothed track, a block slidably mounted in each of said transverse guideways, a driving shaft journaled in said blocks and having a gear thereon in engagement with said toothed track.

11. In a mechanism of the character described and in combination, a supporting means having longitudinal guide-ways and a plurality of transverse guide-ways, a driven member slidably arranged in said longitudinal guide-ways and having an internally toothed track, a block slidably mounted in each of said transverse guideways, a driving shaft journaled in said blocks and having a gear thereon in engagement with said toothed track, said blocks and said driven member having means coöperating to hold said gear in engagement with said toothed track.

12. In a mechanism of the character described and in combination, a supporting means having longitudinal guide-ways and a plurality of transverse guide-ways, a driven member slidably arranged in said longitudinal guide-ways and having an internally toothed track, a block slidably mounted in each of said transverse guideways, a driving shaft journaled in said blocks and having a gear thereon in engagement with said toothed track, said driven member having elongated flanges on each side thereof and said blocks each having a stud on each end adapted to coöperate with said flanges to hold said gear in engagement with said track.

13. A mechanism of the character described, including in combination, a supporting member having longitudinal guide-ways on each side and a pair of transverse guide-ways on opposite sides of said longitudinal guide-ways, a driven member slidably arranged in said longitudinal guide-ways and having an elliptical internally toothed track, a block slidably mounted in each of said transverse guide-ways, a driving shaft journaled in said blocks and having a gear thereon located between said blocks and in engagement with said toothed track; said driven member having flanges on each side thereof paralleling the longer sides of said toothed track, and each of said blocks having a stud at each end adapted to be positioned on the outside of one of the flanges when the gear is in engagement with the toothed track on one side and on the inside of said flange, when the gear is in engagement with the other side of the toothed track, whereby the gear is held in engagement with the longer sides of the toothed track.

14. A mechanism of the character described, including in combination, a supporting member having longitudinal guide-ways on each side and a pair of transverse guide-ways on opposite sides of said longitudinal guide-ways, a driven member slidably arranged in said longitudinal guide-ways and having an elliptical internally toothed track, a block slidably mounted in each of said transverse guide-ways, a driving shaft journaled in said blocks and having a gear thereon located between said blocks and in engagement with said toothed track; said driven member having flanges on each side thereof paralleling the longer sides of said toothed track, and each of said blocks having a stud at each end adapted to be positioned on the outside of one of the flanges when the gear is in engagement with the toothed track on one side and on the inside of said flange, when the gear is in engagement with the other side of the toothed track, whereby the gear is held in engagement with the longer sides of the toothed track, said flanges being shorter than the toothed track, whereby the gear follows the toothed track and the blocks slide when the gear is in engagement with the end portions of the toothed track.

In testimony whereof I sign my name in the presence of two subscribing witnesses.

ALBERT J. HARTLEY.

Witnesses:
JAMES H. SANDERLIN,
E. M. LYONS.

Copies of this patent may be obtained for five cents each, by addressing the "Commissioner of Patents, Washington, D. C."